A. VAN WINKLE & J. T. DANIELS.
ELECTROPLATING APPARATUS.
APPLICATION FILED JUNE 7, 1907.
901,399.
Patented Oct. 20, 1908.
6 SHEETS—SHEET 6.
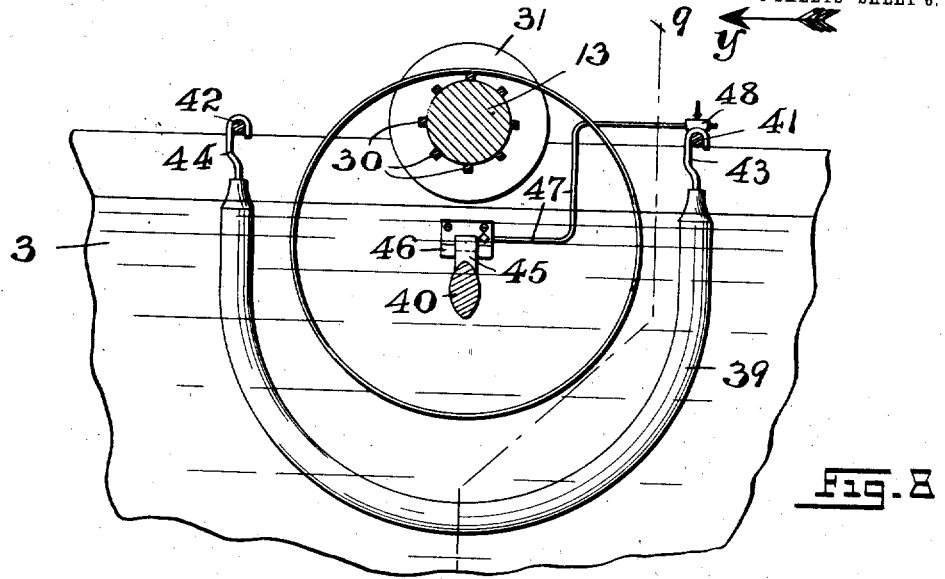
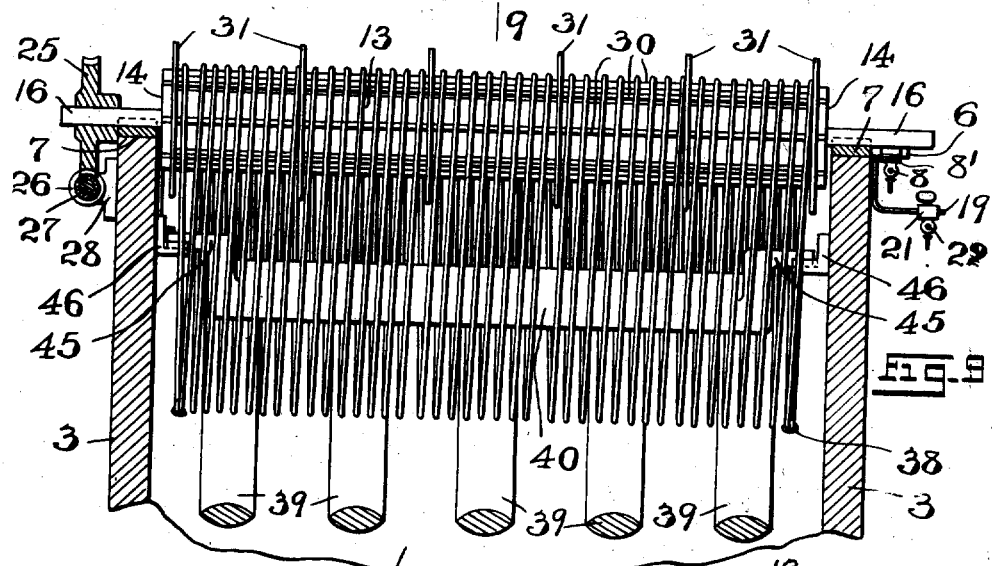
WITNESSES:
T. H. W. Fraentzel
Anna H. Alter
INVENTORS:
Abraham Van Winkle &
John T. Daniels,
BY Fraentzel and Richards
ATTORNEYS

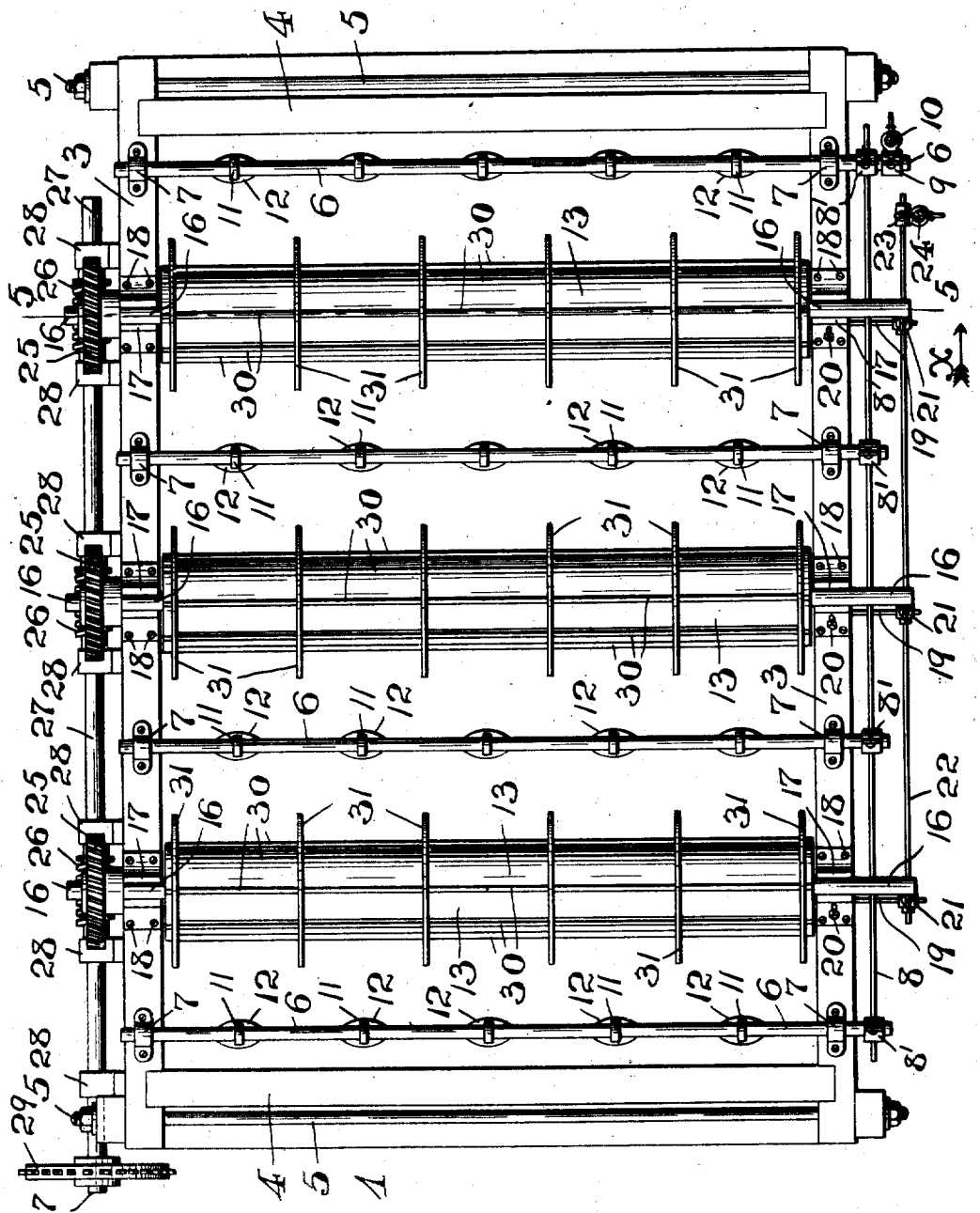

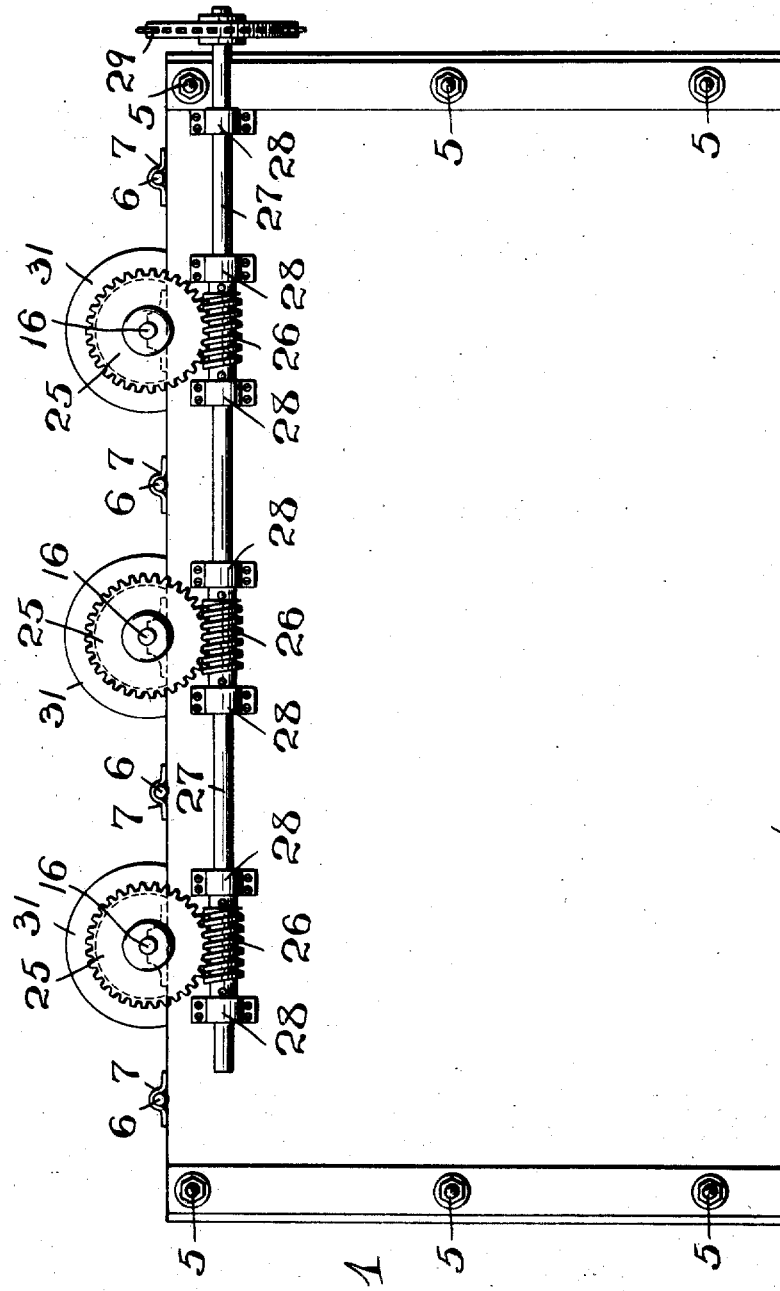

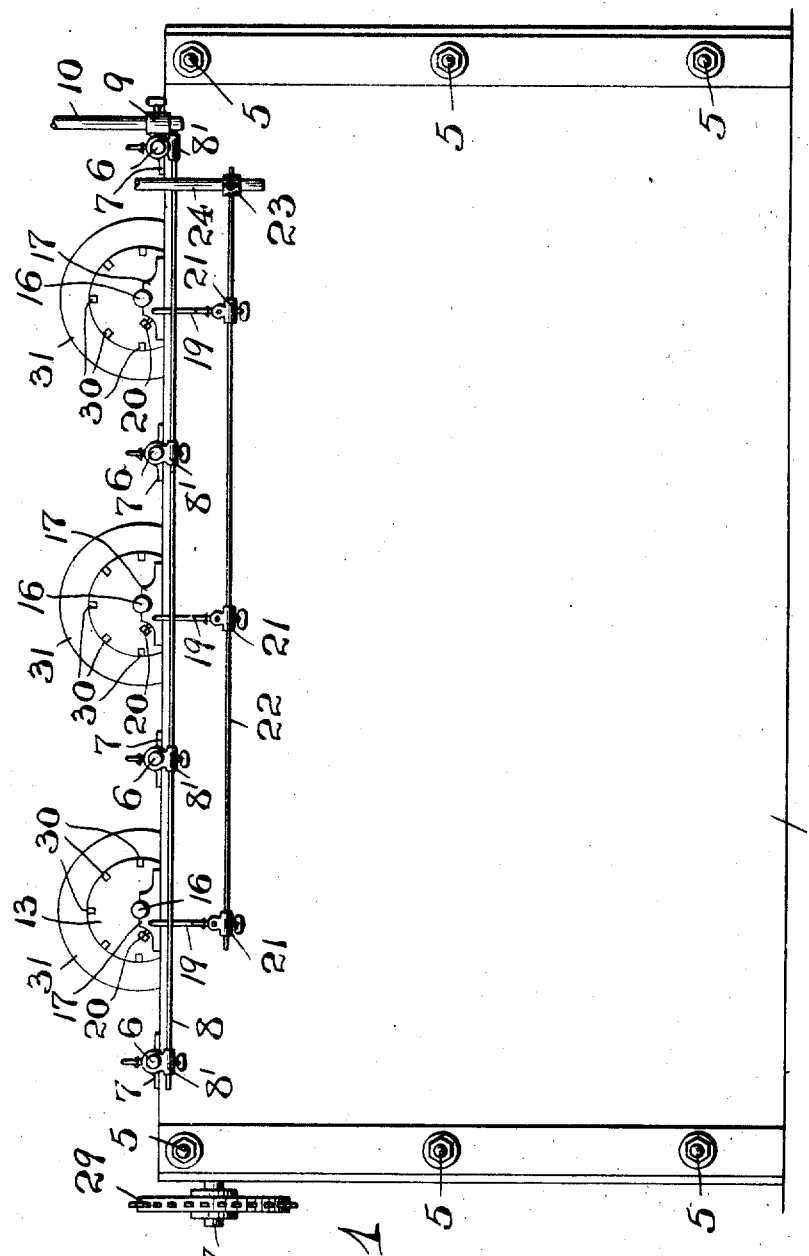

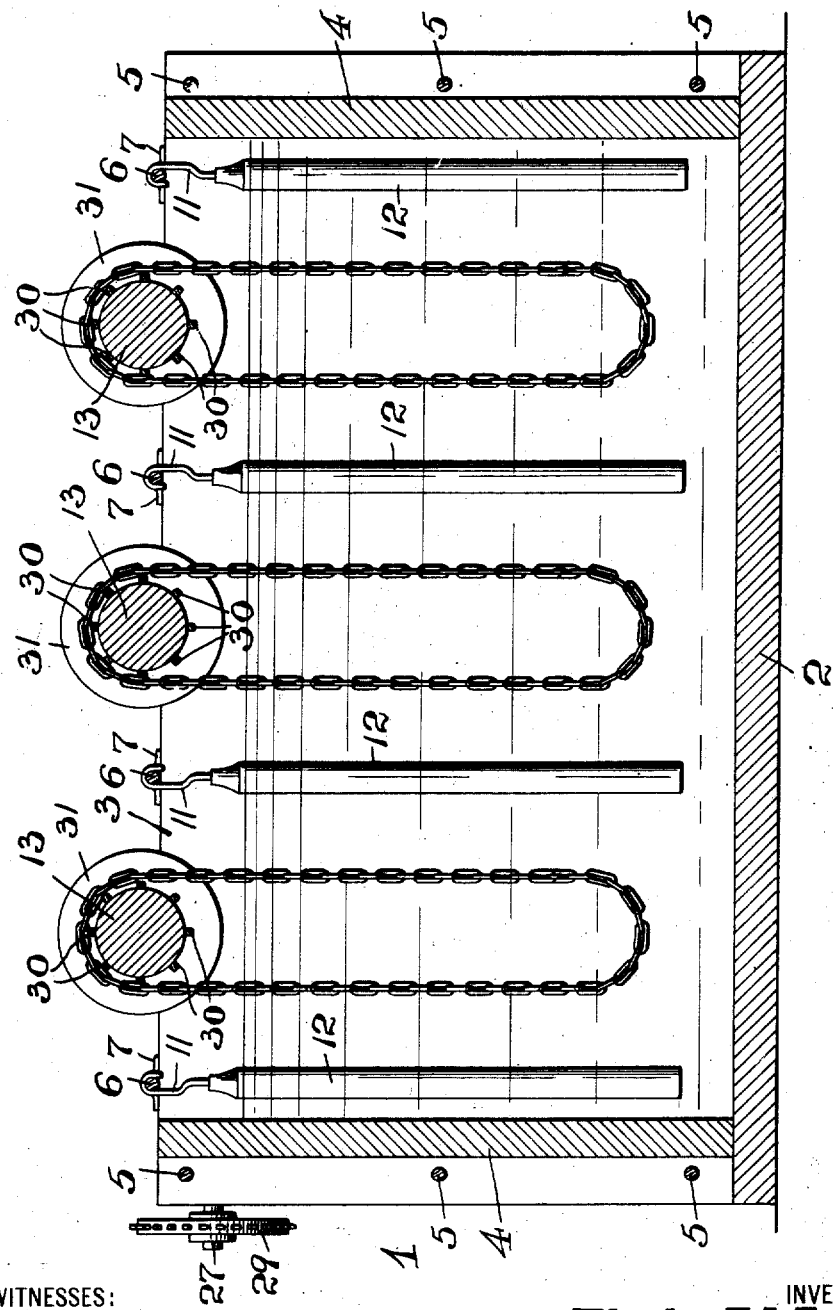

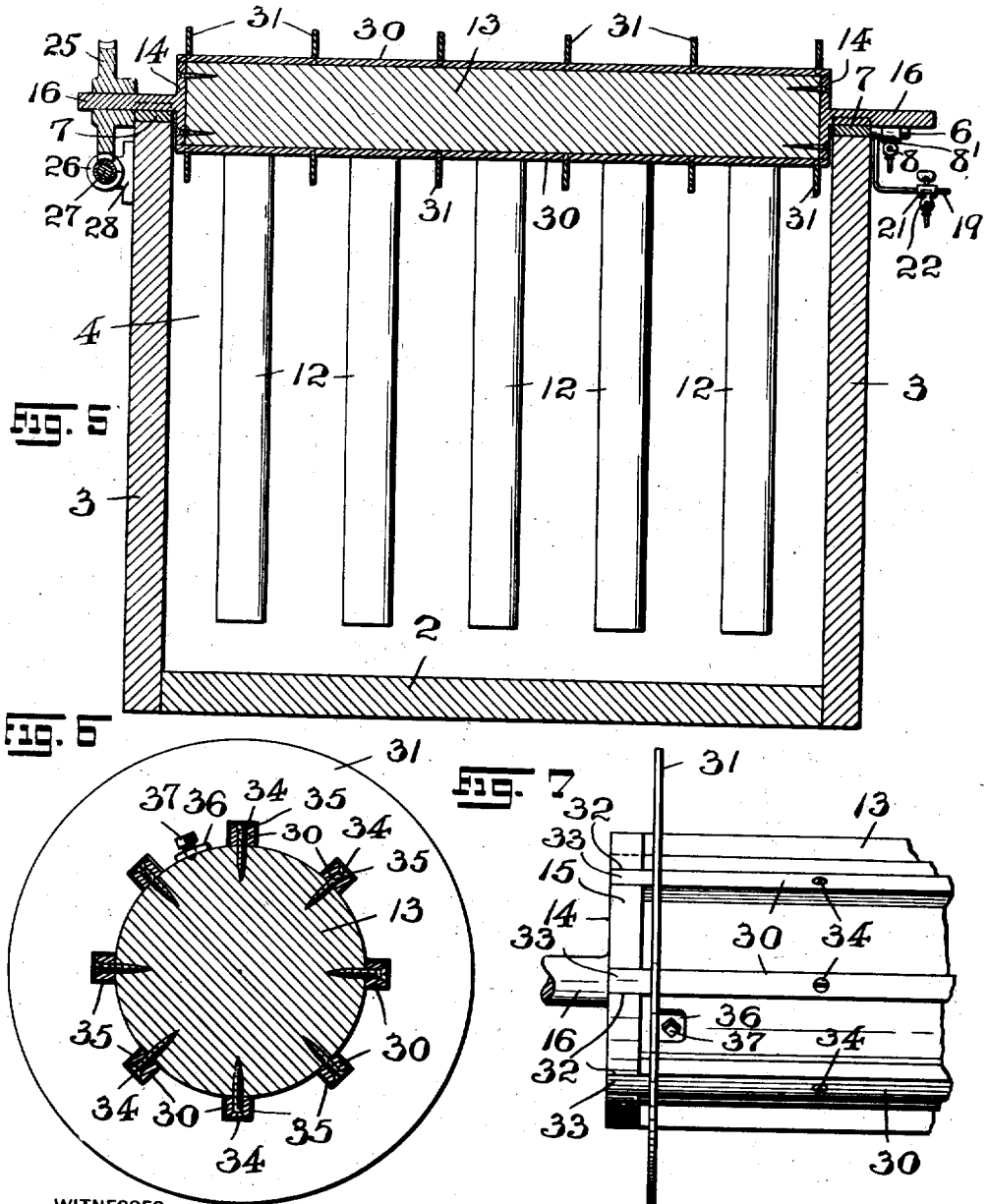

UNITED STATES PATENT OFFICE.

ABRAHAM VAN WINKLE AND JOHN T. DANIELS, OF NEWARK, NEW JERSEY, ASSIGNORS TO THE HANSON & VAN WINKLE COMPANY, A CORPORATION OF NEW JERSEY.

ELECTROPLATING APPARATUS.

No. 901,399.

Specification of Letters Patent.

Patented Oct. 20, 1908.

Application filed June 7, 1907. Serial No. 377,690.

*To all whom it may concern:*

Be it known that we, ABRAHAM VAN WINKLE and JOHN T. DANIELS, citizens of the United States, residing at Newark, in the county of Essex and State of New Jersey, have invented certain new and useful Improvements in Electroplating Apparatus; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in electroplating apparatus; and, the present invention has reference, more particularly, to a novel apparatus for and a novel method of the electro-deposition of a metal upon wire in the coil, or upon chains, hoops, or similar articles which can be arranged upon a revolving support or supports arranged in an electric circuit, and about which the coil of wire, chain, hoop, or the like, is placed so as to receive a rotary motion, about the said revolving support or supports and into and through the electrolyte contained in the vat, tank, or other container forming a part of the apparatus.

The invention has for its principal objects to provide an electro-plating apparatus for the electro-deposition of metals upon wire in the coil, or upon chains, hoops, or similar articles, all with a view of simplifying the method of the electroplating of such articles of manufacture; at the same time cheapening the cost of the production of the electro-deposition, and resulting in a saving of space, and the reduction to a minimum of the devices and parts of the apparatus, over the apparatus and methods at this time employed in electroplating long and flexible strands of wire, chains, and the like.

A further object of this invention is to provide a novel method of the electro-deposition of wire in the coil, or of chains, or hoops, substantially as will hereinafter more fully appear.

A further object of this invention is to provide an apparatus of the general character hereinafter more fully set forth, comprising one or more revolving drums or supports provided with electric conductors, which drums or supports can be quickly raised or lowered, for slipping the coil of wire, chain or hoop which is to be plated upon the said support, or for the removal of the work from the support, the parts being arranged so that such raising operations will not interfere with the parts of the driving mechanism, and in addition saves time, in manipulation.

A further object of this invention is to provide in an electro-plating apparatus in which the coil of wire, chain, hoop, or the like, which is to be electroplated, passes into and out of the electrolyte, as it rolls over the support, a means for producing a shaking or vibratory action of the moving wire-coil, chain, hoop, or the like.

Other objects of this invention not at this time more particularly mentioned will be clearly understood from the following detailed description of the invention.

The invention consists, primarily, in the novel method of electrodeposition, as well as in the novel apparatus hereinafter more particularly set forth; and, furthermore, this invention consists in the various arrangements and combinations of devices and parts, as well as in the details of the construction of the same, all of which will be more fully described in the following specification and then finally embodied in the clauses of the claims which are appended to and which form an essential part of this specification.

The invention is clearly illustrated in the accompanying drawings, in which:—

Figure 1 is a top or plan view of the apparatus embodying the principles of the present invention; and Figs. 2 and 3 are the two side elevations of the same. Fig. 4 is a longitudinal vertical section of the apparatus, showing the apparatus in use for the purposes of electro-depositing metals upon chains. Fig. 5 is a transverse section of the apparatus, said section being taken on line 5—5 in said Fig. 1, looking in the direction of the arrow $x$. Fig. 6 is a cross-section of one of the supporting drums or rolls, said section being made on an enlarged scale; and Fig. 7 is an elevation of the one end-portion of said drum or roll. Fig. 8 is a detail sectional representation of a portion of the tank or vat of the apparatus and one of the supporting rolls and the coil of wire supported thereon, said view illustrating also one arrangement of the metal-anodes employed; and Fig. 9 is a cross-section of the same, said section being taken on line 9—9 in said Fig. 8, looking in the direction of the arrow y. Figs. 10, 11, 12 and 13 are cross-sections of variously formed work-supporting rolls or drums which may be employed with the apparatus.

Similar characters of reference are employed in all of the above described views, to indicate corresponding parts.

Referring now to the several figures of the drawings, the reference-character 1 indicates a suitably constructed tank or vat, the same comprising a base 2, the sides 3, and the ends 4, all of which are suitably connected and may be tied with tie-bolts 5, substantially in the manner shown.

Extending across the upper open portion of the tank or vat is an arrangement of one or more rods or bars 6, which may be held in place by means of suitable fastening devices, as 7.

The reference-character 8 is employed to indicate an electric conductor, such as a rod or wire, which is suitably connected with each rod or bar 6 by means of contact-producing sleeves 8, or other similar fastening means. Upon one of the said rods or bars 6 is another contact-sleeve 9, or similar fastening device, with which is suitably connected an electric conductor, such as a wire or rod 10, which leads from the main source of electricity. Suspended from each rod or bar 6, by means of hooks 11, or in any other suitable manner, are any suitable number of metal anodes, as 12, which are thus arranged in the electrolyte or electroplating solution contained in the said vat or tank.

Arranged in the space between each pair of anode-suspending rods or bars 6 is a revolving work-supporting roll or drum 13. Each roll or drum is usually made of wood, the ends of which have suitably secured thereon, suitable plates or caps 14 of metal, each plate being formed with an annular flange 15 arranged about the marginal edge-portion of the roll or drum, and each plate or cap 14 being also provided with an end-journal 16 extending therefrom. By means of these journals each roll or drum may be rotatively, but at the same time is also removably arranged in an arrangement of semi-circular bearings 17 which may be secured in place upon the upper edge-portions of the sides 8, by means of the bolts or screws 18. The bearings 17 upon the one side of the tank or vat have extending therefrom circuit-wires or rods 19, connected with each bearing by means of a set-screw 20, or other fastening means, the said wires or rods 19 being connected by means of suitably constructed contact-producing members or elements 21 with a connecting wire or rod 22, this wire or rod in turn being also connected, by means of another contact-producing member or element 23 with which is connected the other main circuit wire or rod 24, with the main source of electricity. Upon the opposite end, the journal of each work-supporting roll or drum is provided with a toothed or worm-wheel 25, each wheel 25 being in mesh with a worm 26 upon a driving shaft 27 which revolves in suitable bearings 28, substantially as illustrated in Fig. 2 of the drawings. This shaft 27 is driven from a sprocket-wheel 29, over which may be arranged a link driving chain; or, the said shaft 27 may be operated in any other suitable manner, as will be clearly understood. That the said work-supporting roll or rolls may serve as good conductors for carrying the electric current into and through the work which is, to be electroplated, metal strips, bands or plates 30 are suitably secured upon the cylindrical surface of the roll, said metal strips, bands or plates extending in longitudinal directions and having their end-portions suitably connected with the flanges 15, or other suitable portions of the metal plate or cap at each end of the roll or drum, as will be clearly understood from an inspection of the several figures of the drawings. Separating disks, plates, or partitions 31 may also be suitably arranged and secured upon each roll or drum, so as to form a number of annular spaces in which the chains, or the coils of wire, hoops, or the like are arranged and move by frictional contact with the contact-making strips, bands, or plates 30, so as to complete the electrical circuit through said movably arranged work with the electrolyte or electroplating solution contained in the vat or tank.

In Figs. 6 and 7 of the drawings is shown on an enlarged scale the arrangement of contact-making strips or bands, the same consisting, essentially, of a series of strips or bars 30, and the same being secured to the roll or drum by means of screws or nails 34. The end-portions 33 of the said strips or bars are arranged in cut-away or slotted parts 32 of the flanges 15 and are suitably connected with said flanges 15 or other parts of the end-covers or plates 14, as will be clearly evident. In this construction, the separating disks, plates or partitions are provided with cut-away portions 35, so as to be fitted over the said metal-covered strips or bars 32, as clearly illustrated in said Fig. 6 of the drawings. To secure the said disks, plates or partitions in place, perforated ears or lugs 36 may be provided, as indicated in Fig. 7, for the reception of screws 37 which are screwed into the wooden roll or cylinder.

Having thus described the general con- struction and arrangement of the devices and parts comprising one embodiment of our present invention, to place the cathode or work which is to be plated upon the supporting roll or rolls, the roll is raised from its supporting relation with the semi-circular bearing or bearings, so that the work, in the form of chains, coils of wire, hoops or the like, can be suitably disposed upon a roll or rolls, substantially as shown in Fig. 4 of the drawings, whereupon the journal of the roll is replaced in its bearing. Proper electrical connection having been made in the manner hereinabove described, the electric current is turned on, the shaft which is provided with the worms being also set in operation by means of any suitable prime mover. The rolls, drums or cylinders thus being set in motion, the work will also move into and from the electrolyte or electrolytic solution, whereupon the process of the electro-deposition from the metal anode or anodes to and upon the surfaces of the work immediately takes place, as will be clearly evident. The work being continuously rolled or moved, and the chains, hoops or strands of wire moving side by side, a sufficient frictional contact is produced, so that a bright or burnished electro-deposited surface will be the result.

When it is desired to electroplate wire in the coil, the coil or coils of wire may be slightly separated, the respective ends of the coils being suitably connected, as at 38 in Fig. 9 of the drawings, and an arrangement of metal anodes 39 and 40 may be employed, substantially in the manner illustrated in Figs. 8 and 9 of the drawings. In this construction, anode-supporting rods or bars 41 and 42 extend across the apparatus upon opposite sides of each roll, drum or cylinder, from which are suspended by means of hooks 43, and 44, or other means, suitably formed horse-shoe or U-shaped anodes 39. The other anode-bars 40 are formed at their ends with supporting elements 45 and are suspended horizontally within the coils of wire, said supporting elements 45 resting upon contact-making supports or brackets 46 suitably secured upon the inner faces of the sides of the tank or vat, and one of said supports or brackets 46 being electrically connected by means of a wire or rod 47, and a contact-making fixture or element 48 with one of said anode-supporting rods or bars, as 41, substantially in the manner clearly illustrated. Thus it will be evident, that the metal from the anodes 39 and 40 flows in opposite directions, so as to be deposited from opposite sides upon the moving strands of the coils of wire, or upon the chains or hoops, or other ring-shaped articles which may be placed over the supporting roll, drum, or cylinder.

Instead of making the supporting roll or drum of a cylindrical cross-section, an oval cross-section, as shown in Fig. 10; or a triangular cross-section, as shown in Fig. 11; or a square cross-section, as shown in Fig. 12; or a hexagonal cross-section, as shown in Fig. 13; or, in fact any other polygonal cross-section, may be employed, the purpose being to produce an irregular rotary motion of the work, when the mechanism has been set in operation, so that a jerky motion of the work may result, whereby any beads of hydrogen that may adhere to the work, on those parts which are moving out of the solution, will be shaken off, so as not to interfer with the proper electrodeposition of the metal upon the work.

From the foregoing description of the present invention, it will clearly be seen, that we have devised a simple method and effectively operating mechanism for plating such articles of manufacture, as wire in the coil, chains, hoops, and similar articles, which can be arranged upon a support and brought in rolling relation therewith, so that all portions of the work will be continuously moved or rolled through the electroplating solution.

The invention is of especial advantage and benefit for the purposes of electroplating coils of long strands of wire, the wire being readily plated by simply opening out the coil, so as to slightly separate the strands, and then moving or rolling the coil by means of the contact-producing and work-supporting roll or drum into and through the electroplating solution.

We are fully aware that changes may be made in the arrangement and combinations of the various devices and parts, as well as in the details of the construction of the same, without departing from the scope of this invention, as defined in the appended claims. Hence we do not limit our invention to the exact arrangement and combinations of the devices and parts as described in the foregoing specification, nor do we confine ourselves to the exact details of the construction of the various parts as illustrated in the accompanying drawings.

We claim:—

1. An electroplating apparatus comprising a vat or tank adapted to contain an electroplating solution, and a revoluble support from which the work which is to be plated is suspended and is in rolling engagement with said support, said support being constructed to provide a vibratory action of the work while rolling.

2. An electroplating apparatus comprising a vat or tank adapted to contain an electroplating solution, and a revoluble support from which the work which is to be plated is suspended and is in rolling engagement with said support, said support being constructed to provide a vibratory action of the work while rolling, combined with another support from which metal anodes are adapted to be suspended, and electric circuits with which said supports are connected, substantially as and for the purposes set forth.

3. An electroplating apparatus comprising a vat or tank adapted to contain an electroplating solution, bearings connected with said vat, said bearings being open upon their upper surfaces, and a revoluble support mounted in said bearings from which the work which is to be plated is suspended and is in rolling engagement, and said support, said support being constructed to provide a vibratory action of the work while rolling being adapted to be raised from either bearing for the arrangement of the work over an end-portion of the support, substantially as and for the purposes set forth.

4. An electroplating apparatus comprising a vat or tank adapted to contain an electroplating solution, bearings connected with said vat, said bearings being open upon their upper surfaces, and a revoluble support mounted in said bearings from which the work which is to be plated is suspended and is in rolling engagement, and said support, said support being constructed to provide a vibratory action of the work while rolling being adapted to be raised from either bearings for the arrangement of the work over an end-portion of the support, combined with another support from which metal anodes are adapted to be suspended, and electric circuits with which said supports are connected, substantially as and for the purposes set forth.

5. An electroplating apparatus comprising a vat or tank adapted to contain an electroplating solution, and a revoluble support from which the work which is to be plated is suspended and is in rolling engagement with said support, said support being of such a cross-section that an irregular or vibratory rolling motion of the work will be produced.

6. An electroplating apparatus comprising a vat or tank adapted to contain an electroplating solution, and a revoluble support from which the work which is to be plated is suspended and is in rolling engagement with said support, said support being of such a cross-section that an irregular or vibratory rolling motion of the work will be produced, combined with another support from which metal anodes are adapted to be suspended, and electric circuits with which said supports are connected, substantially as and for the purposes set forth.

7. An electroplating apparatus comprising a vat or tank adapted to contain an electroplating solution, and a revoluble support from which the work which is to be plated is suspended, and is in rolling engagement with said support, the body of said support being a non-conductor of electricity, and metal contact-strips upon said support through which the electric circuit with the rolling work is completed, substantially as and for the purposes set forth.

8. An electroplating apparatus comprising a vat or tank adapted to contain an electroplating solution, and a revoluble support from which the work which is to be plated is suspended, and is in rolling engagement with said support, the body of said support being a non-conductor of electricity, and metal contact-strips upon said support through which the electric circuit with the rolling work is completed, combined with another support from which metal anodes are adapted to be suspended, and electric circuits with which said supports are connected, substantially as and for the purposes set forth.

9. An electroplating apparatus comprising a vat or tank adapted to contain an electroplating solution, and a revoluble support from which the work which is to be plated is suspended and is in rolling engagement with said support, the body of said support being a non-conductor of electricity, a metal end-plate upon each end of said support, a journal extending from each end-plate, and metal contact-strips upon said support and connected at their ends with said end-plates, all arranged that the strips will complete the electric circuit through the rolling work, substantially as and for the purposes set forth.

10. An electroplating apparatus comprising a vat or tank adapted to contain an electroplating solution, and revoluble support from which the work which is to be plated is suspended and is in rolling engagement with said support, the body of said support being a non-conductor of electricity, a metal end-plate upon each end of said support, a journal extending from each end-plate, and metal contact-strips upon said support and connected at their ends with said end-plates, all arranged that the strips will complete the electric circuit through the rolling work, combined with another support from which metal anodes are adapted to be suspended, and electric circuits with which said supports are connected, substantially as and for the purposes set forth.

11. An electroplating apparatus comprising a vat or tank adapted to contain an electroplating solution, and a revoluble support from which the work which is to be plated is suspended and is in rolling engagement with said support, said support being of such a cross-section that an irregular or vibratory rolling motion of the work will be produced, the body of said support being a non-conductor of electricity, and metal contact-strips upon said support through which the electric current with the rolling work is completed, substantially as and for the purposes set forth.

12. An electroplating apparatus comprising a vat or tank adapted to contain an electroplating solution, and a revoluble support from which the work which is to be plated is suspended and is in rolling engagement with said support, said support being of such a cross-section that an irregular or vibratory rolling motion of the work will be produced, the body of said support being a non-conductor of electricity, and metal contact-strips upon said support through which the electric current with the rolling work is completed, combined with another support from which metal anodes are adapted to be suspended, and electric circuits with which said supports are connected, substantially as and for the purposes set forth.

13. An electroplating apparatus comprising a vat or tank adapted to contain an electroplating solution, and a revoluble support from which the work which is to be plated is suspended and is in rolling engagement with said support, said support being of such a cross-section that an irregular or vibratory rolling motion of the work will be produced, the body of said support being a non-conductor of electricity, a metal end-plate upon each end of said support, a journal extending from each end-plate, and metal contact-strips upon said support and connected at their ends with said end-plates, all arranged that the strips will complete the electric circuit through the rolling work, substantially as and for the purposes set forth.

14. An electroplating apparatus comprising a vat or tank adapted to contain an electroplating solution, and a revoluble support from which the work which is to be plated is suspended and is in rolling engagement with said support, said support being of such a cross-section that an irregular or vibratory rolling motion of the work will be produced, the body of said support being a non-conductor of electricity, a metal end-plate upon each end of said support, a journal extending from each end-plate, and metal contact-strips upon said support and connected at their ends with said end-plates, all arranged that the strips will complete the electric circuit through the rolling work, combined with another support from which metal anodes are adapted to be suspended, and electric circuits with which said supports are connected, substantially as and for the purposes set forth.

15. An electroplating apparatus comprising a vat or tank adapted to contain an electroplating solution, and a revoluble support from which the work which is to be plated is suspended, and is in rolling engagement with said support, the body of said support being a non-conductor of electricity, and metal contact-strips upon said support through which the electric circuit with the rolling work is completed, and separating disk or plates upon said support, substantially as and for the purposes set forth.

16. An electroplating apparatus comprising a vat or tank adapted to contain an electroplating solution, and revoluble support from which the work which is to be plated is suspended and is in rolling engagement with said support, the body of said support being a non-conductor of electricity, a metal end-plate upon each end of said support, a journal extending from each end-plate, and metal contact-strips upon said support and connected at their ends with said end-plates, all arranged that the strips will complete the electric circuit through the rolling work, and separating disk or plates upon said support, substantially as and for the purposes set forth.

17. An electroplating apparatus comprising a vat or tank, adapted to contain an electroplating solution, a multiplicity of revoluble supports from each of which the work which is to be plated is suspended and is in rolling engagement with the support, bearings connected with said vat, said bearings being open upon their upper surfaces, the body of each support being a non-conductor of electricity, a metal end-plate upon each support, a journal extending from each plate and mounted in said bearings, metal contact-strips upon each support and connected at their ends with said end-plates so that the strips will complete electric circuits through the rolling work, a driving shaft, worms upon said shaft, and a worm-gear upon one of the journals of each support in mesh with a worm, all being arranged for simultaneously revolving all supports, substantially as and for the purposes set forth.

18. An electroplating apparatus comprising a vat or tank adapted to contain an electroplating solution, a multiplicity of revoluble supports from each of which the work which is to be plated is suspended and is in rolling engagement with the support, bearings connected with said vat, said bearings being open upon their upper surfaces, the body of each support being a non-conductor of electricity, a metal end-plate upon each support, a journal extending from each plate and mounted in said bearings, metal contact-strips upon each support and connected at their ends with said end-plates so that the strips will complete electric circuits through the rolling work, a driving shaft, worms upon said shaft, and a worm-gear upon one of the journals of each support in mesh with a worm, all being arranged for simultaneously revolving all supports, combined with other intermediately disposed supports from which metal anodes are adapted to be suspended, and electric circuits with which the work-suspending and anode-suspending supports are connected, substantially as and for the purposes set forth.

In testimony, that we claim the invention set forth above we have hereunto set our hands this 6th day of June, 1907.

ABRAHAM VAN WINKLE.
JOHN T. DANIELS.

Witnesses:
F. H. W. FRAENTZEL,
W. R. ANTHONY.